US012793070B2

(12) United States Patent
Ghosh et al.

(10) Patent No.: US 12,793,070 B2
(45) Date of Patent: Nov. 10, 2026

(54) METHOD AND SYSTEM FOR CRYPTOCURRENCY FRAUD DETECTION USING UNSUPERVISED DOMAIN ADAPTION

(71) Applicant: Mastercard International Incorporated, Purchase, NY (US)

(72) Inventors: Soumyadeep Ghosh, Gurgaon (IN); Adarsh Patankar, Betul (IN); Rohit Jain, Jalaun (IN); Deepak Yadav, Gurgaon (IN)

(73) Assignee: Mastercard International Incorporated, Purchase, NY (US)

( * ) Notice: Subject to any disclaimer, the term of this patent is extended or adjusted under 35 U.S.C. 154(b) by 153 days.

(21) Appl. No.: 18/242,167

(22) Filed: Sep. 5, 2023

(65) Prior Publication Data

US 2025/0078081 A1 Mar. 6, 2025

(51) Int. Cl.
*G06Q 20/40* (2012.01)
*G06N 3/08* (2023.01)

(52) U.S. Cl.
CPC ........... *G06Q 20/4016* (2013.01); *G06N 3/08* (2013.01)

(58) Field of Classification Search
None
See application file for complete search history.

(56) References Cited

U.S. PATENT DOCUMENTS 9,817,880 B1 11/2017 Liu et al.
10,460,320 B1 10/2019 Cao et al.
10,484,413 B2 11/2019 Kar et al.
(Continued)

FOREIGN PATENT DOCUMENTS

CN 110308962 B 8/2022
EP 3282666 A1 2/2018
(Continued)

OTHER PUBLICATIONS

Notification of Transmittal of the International Search Report and the Written Opinion of the International Searching Authority, or the Declaration, issued on Oct. 21, 2024, in corresponding International Application No. PCT/US2024/036667, 10 pages.
(Continued)

*Primary Examiner* — Chrystina E Zelaskiewicz
(74) *Attorney, Agent, or Firm* — PANITCH SCHWARZE BELISARIO & NADEL LLP

(57) ABSTRACT

A method for identifying fraudulent cryptographic currency transactions using a deep neural network includes: receiving, by a receiver of a processing server, a source dataset, the source dataset including labeled source data associated with a plurality of source features and being associated with a source domain; receiving, by the receiver of the processing server, a target dataset, the target dataset including unlabeled target data associated with a plurality of target features and being associated with a target domain; combining, by a processor of the processing server, at least a subset of the plurality of source features and at least a subset of the plurality of target features into a combined data layer; training, by the processor of the processing server, a deep neural network using a domain adaptation algorithm and the combined data layer to identify a set of final features.

12 Claims, 6 Drawing Sheets

(56) References Cited

U.S. PATENT DOCUMENTS

| | | | | |
|---|---|---|---|---|
| 11,316,874 | B2 | 4/2022 | Lee et al. | |
| 2016/0342994 | A1 | 11/2016 | Davis | |
| 2019/0318359 | A1 | 10/2019 | Arora | |
| 2019/0325528 | A1* | 10/2019 | Adjaoute | G06N 3/006 |
| 2019/0354801 | A1 | 11/2019 | Sohn et al. | |
| 2019/0385170 | A1 | 12/2019 | Arrabothu et al. | |
| 2020/0099530 | A1 | 3/2020 | Khatib et al. | |
| 2022/0067752 | A1* | 3/2022 | Fang | H04L 63/20 |
| 2022/0253952 | A1* | 8/2022 | Jevans | G06Q 20/065 |
| 2023/0107703 | A1* | 4/2023 | Zhang | G06N 20/00<br>705/39 |
| 2023/0196318 | A1* | 6/2023 | Rosen | G06Q 20/3829<br>705/71 |
| 2024/0296208 | A1* | 9/2024 | Abbassi | G06F 21/108 |

FOREIGN PATENT DOCUMENTS

| | | | |
|---|---|---|---|
| KR | 102112913 | B1 | 5/2020 |
| KR | 20200094827 | A | 8/2020 |
| KR | 20220074327 | A | 6/2022 |

OTHER PUBLICATIONS

Ko Kyung Chan et al, Design of Monitoring and Analysis System On Blockchain Network [online], May 10, 2018 [retrieved on Sep. 30, 2024]. retrieved from the Internet<URL: https://oasis.postech.ac.kr/handle/2014.oak/100657>.

Notification of Transmittal of the International Search Report and the Written Opinion of the International Searching Authority, or the Declaration, issued on Dec. 6, 2024, in International Application No. PCT/US2024/043337, 8 pages.

Moy et al, Copending U.S. Appl. No. 18/233,068, entitled "Method and System for Cryptocurrency Fraud Detection", filed Aug. 11, 2023.

Sun et al, "Deep CORAL: Correlation Alignment for Deep Domain Adaptation," University of Massachusetts Lowell, Boston University, Jul. 6, 2016, 7 pgs.

Ashfaq et al, "A Machine Learning and Blockchain Based Efficient Fraud Detection Mechanism," Sensors, Sep. 21, 2022, pp. 1-20.

Chen et al, "Bitcoin Theft Detection Based on Supervised Machine Learning Algorithms," Hindawi, Security and Communication Networks, vol. 2021, Article ID 6643763, Feb. 26, 2021, 10 pgs.

Monamo et al, "Unsupervised Learning for Robust Bitcoin Fraud Detection," IEEE, Council for Scientific and Industrial Research, 2016, 6 pgs.

Kundu, "Domain Adaptation in Computer Vision: Everything You Need to Know," www.v7labs.com/blog/domain-adaptation-guide#h2 (downloaded May 31, 2023), Jul. 1, 2022, 39 pgs.

Non-Final Office Action issued on Mar. 5, 2025, in subject matter U.S. Appl. No. 18/233,068 (38 Pages).

Ko, Kyung Chan, Design of Monitoring and Analysis System on Blockchain Network, Department of Computer Science and Engineering, Posttech, <https://oasis.postech.ac.kr/handle/2014.oak/100657,> KNOM Conference 2018, May 10, 2028. (Year 2018), pp. 19-20.

Final Office Action mailed Aug. 11, 2025 in corresponding U.S. Appl. No. 18/233,068, 37 pages.

Non-Final Office Action mailed Dec. 10, 2025 in corresponding U.S. Appl. No. 18/233,068 (34 pages).

Yoo, Hyeonsik, Loan Regular Auditing System Using Artificia Intellicence (google patent translation of patent 10-2022-007 4327), Jun. 3, 2022 (Year: 2022).

Lin, Yan-sheng, Network Management Block Chain Method, Electronic Device And Medium, (PE2E translation of patent CN 110308962 B), Aug. 23, 2022 (Year: 2022).

First Examination Report issued on May 25, 2026, in the Indian Patent Office in corresponding Indian Application No. 202647004164 (9 Pages) corresponding to related U.S. Appl. No. 18/233,068.

Kyungchan Ko et al. "Design of Monitoring and Analysis System on Blockchain Network"; <https://oasis,postech.ac.kr/handle/2014.oak/100657;> KNOM Conf. 2018; May 10, 2018; 4 pages.

Final Office Action mailed May 8, 2026, in corresponding U.S. Appl. No. 18/233,068 (43 pages).

* cited by examiner

300

METHOD AND SYSTEM FOR CRYPTOCURRENCY FRAUD DETECTION USING UNSUPERVISED DOMAIN ADAPTION

FIELD

The present disclosure relates to using unsupervised domain adaptation for detecting crypto fraud, specifically the use of unsupervised domain adaptation to utilize labeled data for other types of transactions to identify useful feature sets for identifying fraudulent transactions from unlabeled crypto data.

BACKGROUND

Blockchains were first developed as a way to process transactions and exchange cryptographic currency using a system that was both decentralized and anonymous. Decentralization allows for a system that is not controlled by any single entity or group, which can provide users advantages over traditional payment processing systems. Anonymity can allow for users to engage in payment transactions without being tracked or having to provide personally identifiable information. However, while the benefits of decentralization and anonymity can be beneficial for users, blockchain architecture has also been utilized for the purposes of money laundering.

With traditional payment transactions that utilize electronic payment cards, such as credit cards or debit cards that are processed via a payment network, sophisticated fraud tools exist to detect when money laundering or other fraudulent behavior is being attempted via a new payment transaction. However, no such tools have been developed for blockchain transactions that utilize cryptographic currency, also referred to herein as cryptocurrency transactions. The lack of such tools has resulted in a significant amount of money laundering of over one billion dollars a year using various blockchain currencies. Fraud tools are developed for traditional payment transactions by utilizing a wealth of historical data that includes known fraudulent transactions and known genuine transactions. Because there is a meaningful lack of data regarding fraudulent blockchain transactions, fraud tools for blockchain transactions have, thus far, been impossible to develop.

Thus, there is a need for a technological improvement that can utilize labeled data for electronic payment transactions to be used to detect fraud for unlabeled blockchain transactions.

SUMMARY

The present disclosure provides a description of systems and methods for identifying fraudulent cryptographic currency transactions using a deep neural network. Labeled data for electronic payment transactions that includes feature sets are received along with unlabeled data for cryptographic transactions that also includes feature sets. An autoencoder can be used to identify more useful features from the cryptographic feature sets. The feature sets for the electronic payment transactions and cryptographic transactions can be combined into a single feature set. A deep neural network can then be trained via the use of a domain adaptation algorithm, such as Deep CORAL and the combined feature set, where the algorithm enables the features from the labeled electronic payment transaction data to be aligned with the features from the unlabeled cryptocurrency transaction data. In an exemplary embodiment, the deep neural network can be trained until a difference between a CORAL loss and a classification loss is within a predetermined value. The training can result in the identification of a final feature set, which can be applied to unlabeled cryptocurrency transaction data to identify fraudulent blockchain transactions with a high rate of success without the need for previously identified fraudulent blockchain transactions.

A method for identifying fraudulent cryptographic currency transactions using a deep neural network includes: receiving, by a receiver of a processing server, a source dataset, the source dataset including labeled source data associated with a plurality of source features and being associated with a source domain; receiving, by the receiver of the processing server, a target dataset, the target dataset including unlabeled target data associated with a plurality of target features and being associated with a target domain; combining, by a processor of the processing server, at least a subset of the plurality of source features and at least a subset of the plurality of target features into a combined data layer; training, by the processor of the processing server, a deep neural network using a domain adaptation algorithm and the combined data layer to identify a set of final features.

A system for identifying fraudulent cryptographic currency transactions using a deep neural network includes: a processing server including a receiver receiving a source dataset, the source dataset including labeled source data associated with a plurality of source features and being associated with a source domain, and a target dataset, the target dataset including unlabeled target data associated with a plurality of target features and being associated with a target domain, and a processor combining at least a subset of the plurality of source features and at least a subset of the plurality of target features into a combined data layer, and training a deep neural network using a domain adaptation algorithm and the combined data layer to identify a set of final features.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

System for Identification of Fraudulent Blockchain Transactions

Figure 1:
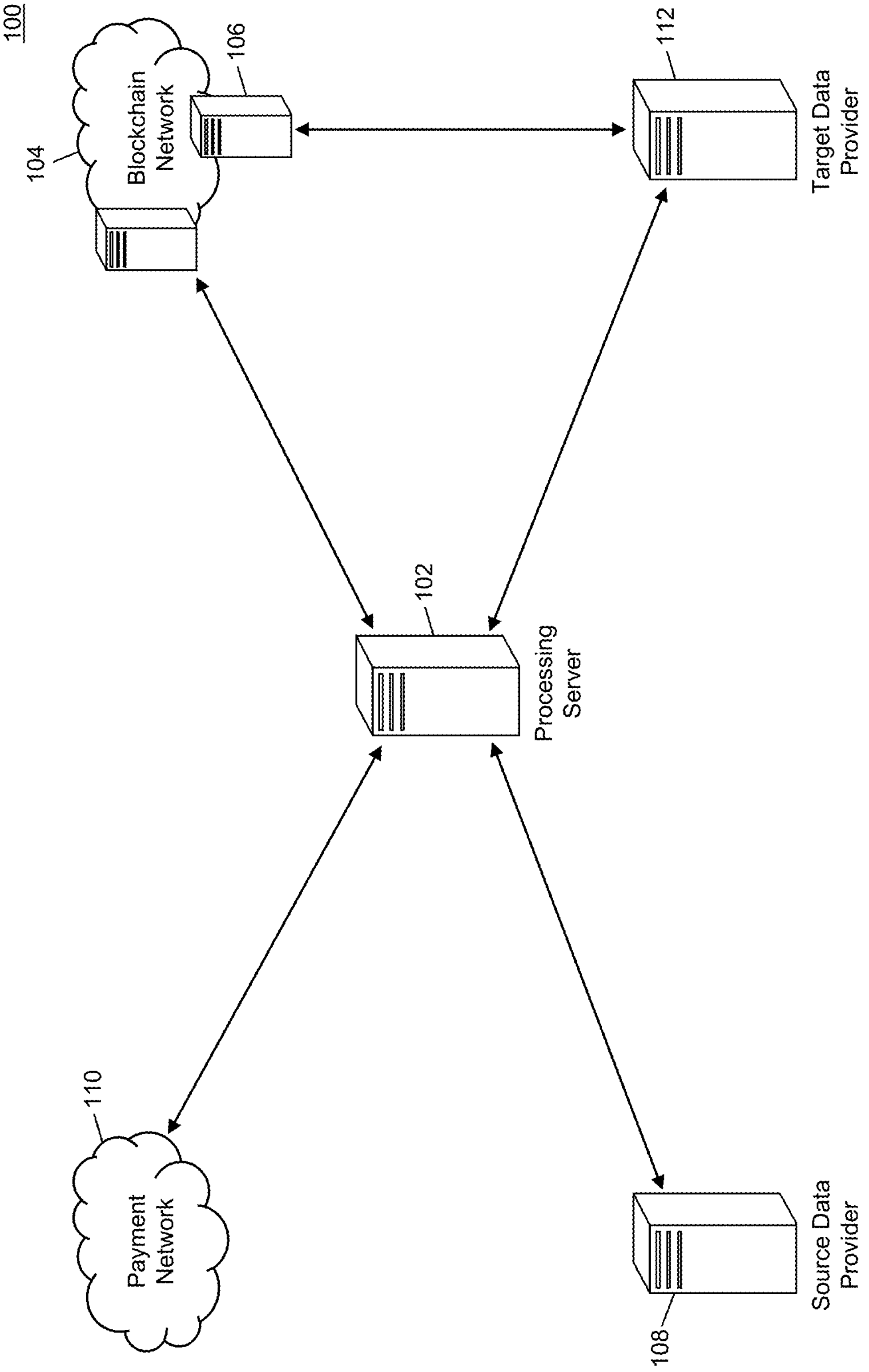
FIG. 1 is a block diagram illustrating a high-level system architecture for identifying fraudulent cryptographic currency transactions in accordance with exemplary embodiments.

FIG. 1 illustrates a system 100 for the identification of fraudulent blockchain transactions via the use of a deep neural network and domain adaptation that can utilize labeled data for electronic payment transactions to identify fraud in unlabeled blockchain transaction data. System 100 can include a processing server 102. The processing server 102, discussed in more detail below, can be configured to identify a final feature set for use in identifying fraudulent transactions through the training of a deep neural network with a domain adaptation algorithm.

Figure 5:
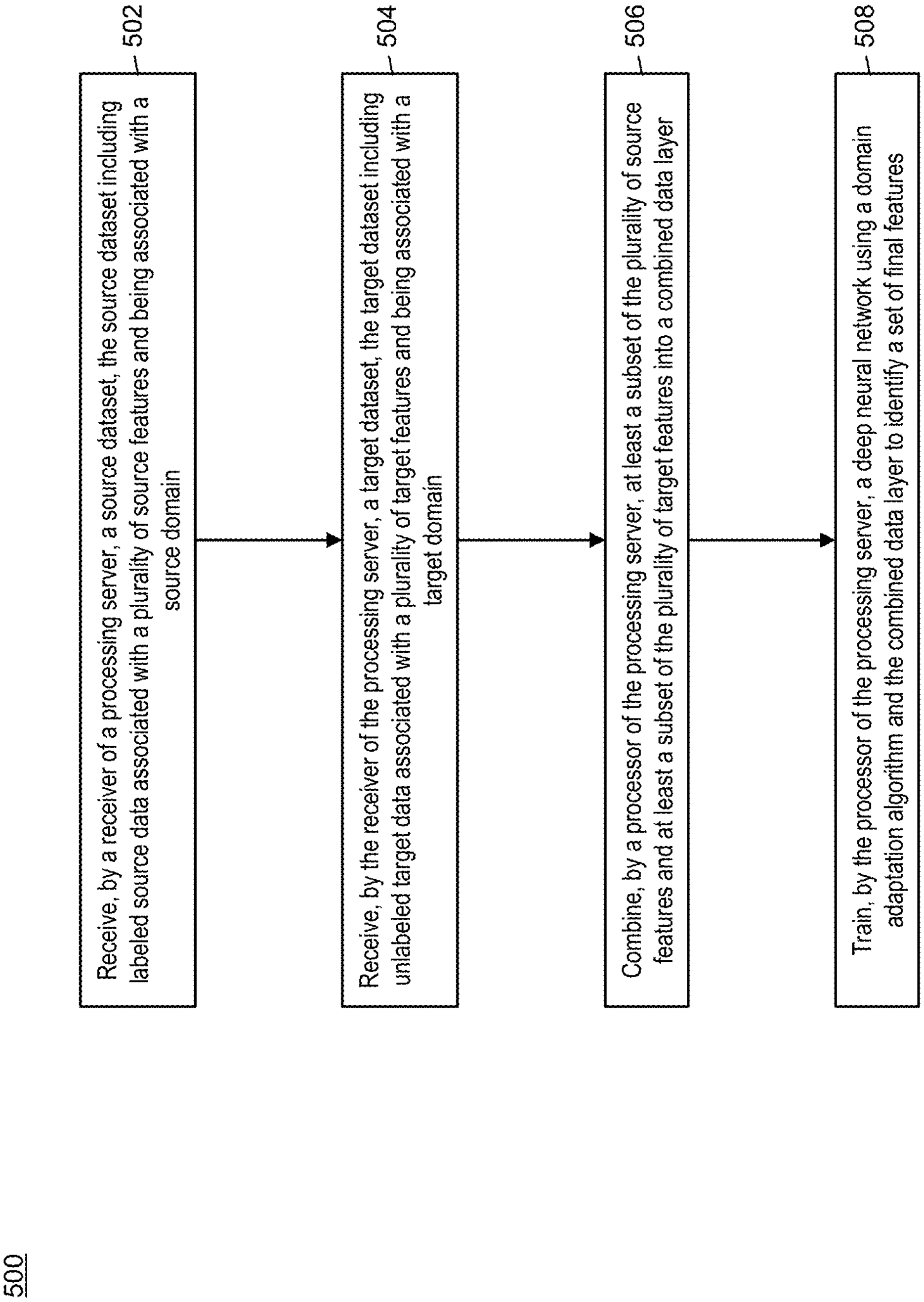
FIG. 5 is a flow chart illustrating an exemplary method for identifying fraudulent cryptographic currency transactions using a deep neural network in accordance with exemplary embodiments.

The system 100 can also include a blockchain network 104. The blockchain network 104 can be comprised of a plurality of blockchain nodes 106. Each blockchain node 106 can be a computing system, such as illustrated in FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In some embodiments, the processing server 102 can be a blockchain node 106.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 106 in the blockchain network 104 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" can refer specifically to the private key. In other cases, the term "blockchain wallet" can refer to a computing device that stores the private key for use thereof in blockchain transactions. For instance, each computing device can each have their own private key for respective cryptographic key pairs and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of that is generated using the sender's private key, a blockchain address of the recipient of currency generated using the recipient's public key, and a blockchain currency amount that is transferred, or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 106 in the blockchain network 104, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other blockchain nodes 106 in the blockchain network 104 before being added to the blockchain and distributed to all of the blockchain nodes 106 in the blockchain network 104, respectively, in traditional blockchain implementations. In cases where a blockchain data value cannot be related to a blockchain transaction, but instead the storage of other types of data, blockchain data values can still include or otherwise involve the validation of a digital signature.

In the system 100, a blockchain node 106 in the blockchain network 104 can collect transaction data for blockchain transactions into a dataset. As discussed herein, blockchain transactions can be considered the target domain with respect to the training of the deep neural network and domain adaptation, as the dataset of blockchain transactions can include unlabeled data. As used herein, unlabeled data can refer to data that is not classified. The dataset of blockchain transactions can also be referred to herein as a target dataset, as it is a dataset that includes data from the target domain. In some instances, the target dataset can include a mix of labeled data and unlabeled data. In such cases, the labeled data can be utilized with labeled source data, discussed below, in the training of the deep neural network.

The blockchain node 106 can electronically transmit the target dataset with the unlabeled target data to the processing server 102 using a suitable communication network and method. In some embodiments, the system 100 can also include a target data provider 112. The target data provider 112 can be an entity and/or system separate from a blockchain node 106 that collects (e.g., from blockchain nodes 106 or other systems) unlabeled target data with a plurality of associated features. The target data provider 112 can generate a target dataset using the data and provide the target dataset to the processing server 102 using a suitable communication network and method.

The system 100 can also include a source data provider 108. The source data provider 108 can be an entity and/or system that collects data for electronic payment transactions. Electronic payment transactions can be considered the source domain with respect to the training of the deep neural network and domain adaptation. Data regarding electronic payment transactions can also be referred to herein as source data. The source data can be labeled, which can refer to data that is classified. For example, each electronic payment transaction in the source dataset can be classified as a fraudulent or genuine transaction, where such a classification can be considered labeling of the data. The source data provider 108 can collect labeled source data into a source dataset that includes the labeled source data and a plurality of associated features. The source data provider 108 can electronically transmit the source dataset with associated features to the processing server 102 using a suitable communication network and method. In some cases, the system 100 can also include a payment network 110. The payment network 110 can be a payment processing network that is configured to process electronic payment transactions via payment rails or other specialized architecture. In some instances, the payment network 110 can be the source data provider 108 that provides the source dataset to the processing server 102. In other instances, the source data provider 108 can collect the source data from one or more payment networks 110. In some embodiments, the system 100 can include a plurality of source data providers 108 and target data providers 112 from which the processing server 102 receives source data and target data.

The processing server 102 can receive the labeled source data with associated features and the unlabeled target data with associated features. The processing server 102 can create a combined feature set using the source features and the target features. In some embodiments, the processing server 102 can identify a subset of one or both of the feature sets prior to creating the combined feature set. In such embodiments, the processing server 102 can train an autoencoder, which can be an unsupervised neural network, to identify the subset of a feature set. The autoencoder can process the feature set, referred to herein as raw features, to identify a subset of that feature set, referred to herein as latent features. In some cases, latent source features and latent target features can be identified and combined into the combined feature set. In other cases, raw source features and latent target features can be identified and combined into the combined feature set.

Once the combined feature set has been created, the processing server 102 can train a deep neural network using a domain adaptation algorithm and the combined feature set. The deep neural network can be trained using appropriate weights until a suitable classification loss and/or domain loss is reached. In some embodiments, the deep neural network can utilize Deep CORAL as its domain adaption algorithm. Deep CORAL can determine a CORAL loss between the source domain and the target domain for a single feature layer using the following equation:

$$l_{CORAL} = \frac{1}{4d^2} \| C_S - C_T \|_F^2 \quad (1)$$

where $$\| \cdot \|_F^2$$

denotes the squared matrix Frobenius norm, $C_S$ and $C_T$ denote the source and target covariance matrices, respectively, and d refers to the dimension. In an exemplary embodiment, the deep neural network can be trained until a difference between the CORAL loss and the classification loss is below a predetermined value. In such a case, the loss constrains the distance between the source domain and the target domain, resulting in better performance on the target domain while maintaining strong classification accuracy on the source domain.

Once the deep neural network has been sufficiently trained, a finished feature set can be identified from the deep neural network. The finished feature set can be a set of features that can be applied to the unlabeled target data to identify likely fraudulent blockchain transactions. The result is the identification of fraudulent blockchain transactions without the use of any labeled blockchain data, through the use of domain adaptation from labeled electronic payment transaction data. This allows for fraud detection for cryptographic transactions and the development of fraud tools without having to first identify a suitable amount of labeled, fraudulent blockchain transactions via other means.

In some embodiments, the deep neural network can also utilize backpropagation as part of the domain adaptation. Backpropagation can backpropagate classifier loss and domain loss during the training in order to strengthen the training of the neural network using the source and target data. In some cases, a gradient reversal layer can be used. During forward propagation, the gradient reversal layer can act as an identity transform. During backpropagation, the gradient reversal layer can take the gradient from the subsequent level, multiplied, and passed to the preceding layers. In an exemplary embodiment, the processing server 102 can utilize a combination of an autoencoder for the target raw features, backpropagation and a gradient reversal layer, and Deep CORAL on a combined dataset to identify a final feature set that is applied to unlabeled target data. This can result in strong feature set that can be used for fraud detection in blockchain transactions utilizing unsupervised domain adaptation with labeled electronic payment transaction data. In some cases, supervised domain adaptation can be performed by the use of labeled target data in addition to the unlabeled target data, which can further increase performance in some cases.

Processing Server

Figure 2:
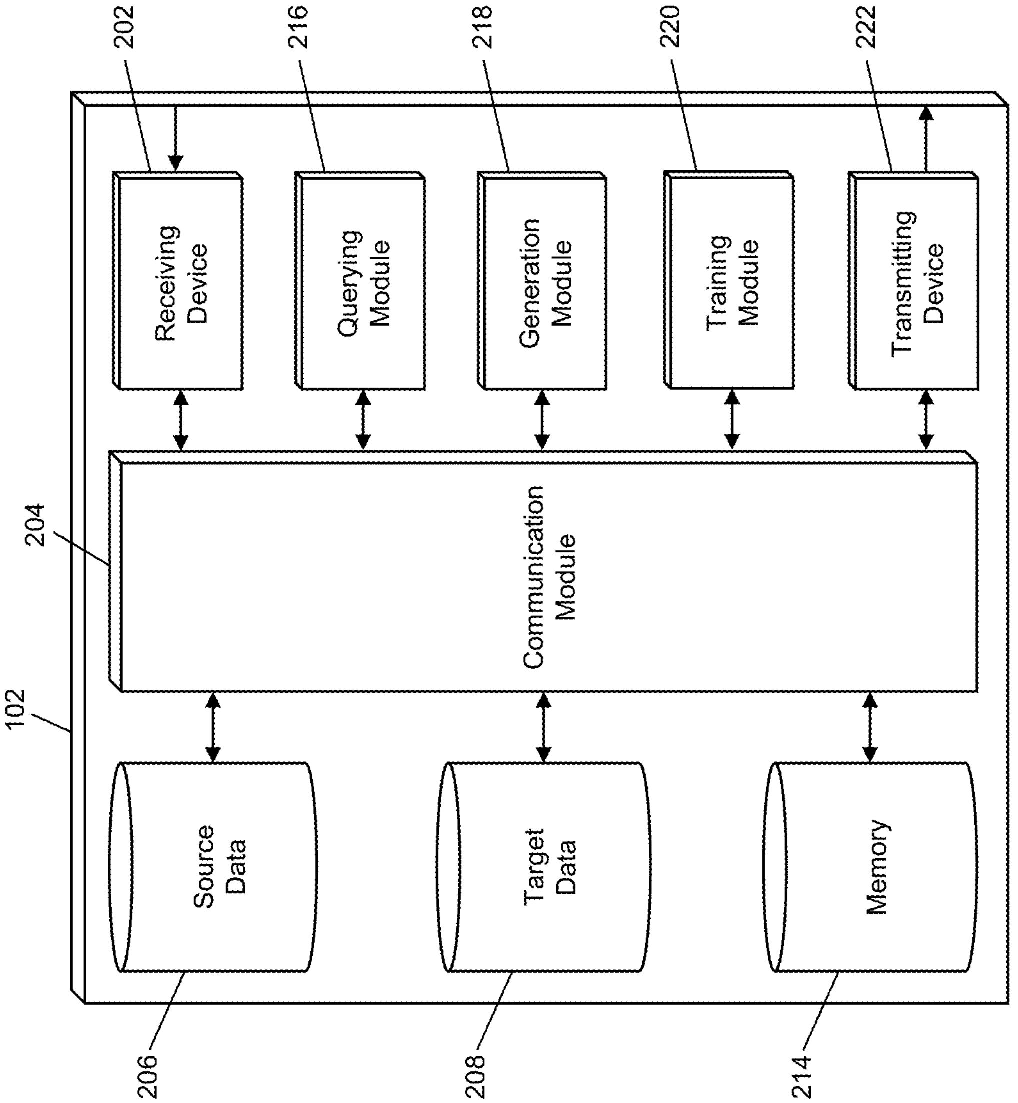
FIG. 2 is a block diagram illustrating the processing server in the system of FIG. 1 for identifying fraudulent cryptographic currency transactions in accordance with exemplary embodiments.

FIG. 2 illustrates an embodiment of the processing server 102 in the system 100 of FIG. 1. It will be apparent to persons having skill in the relevant art that the embodiment of the processing server 102 illustrated in FIG. 2 is provided as illustration only and cannot be exhaustive to all possible configurations of the processing server 102 suitable for performing the functions as discussed herein. For example, the computer system 500 illustrated in FIG. 5 and discussed in more detail below can be a suitable configuration of the processing server 102. In some cases, other components of the system 100, such as the blockchain nodes 106, source data provider 108, payment network 110, and target data provider 112 can include the components illustrated in FIG. 2 and discussed below.

The processing server 102 can include a receiving device 202. The receiving device 202 can be configured to receive data over one or more networks via one or more network protocols. In some instances, the receiving device 202 can be configured to receive data from blockchain nodes 106, source data providers 108, payment networks 110, target data providers 112, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by blockchain nodes 106 and/or target data providers 112 that are superimposed or otherwise encoded with target datasets, which can include unlabeled blockchain transactions and a plurality of associated features. The receiving device 202 can also be configured to receive data signals electronically transmitted by source data providers 108 and/or payment networks 110, which can be superimposed or otherwise encoded with source datasets, which can include labeled electronic payment transactions and a plurality of associated features. The receiving device 202 can also be configured to receive data for use in the training of deep neural networks, such as domain adaptation algorithms, weights, requested classification and/or CORAL loss values, etc., such as can be transmitted to the processing server 102 from other systems or received via suitable input devices.

The processing server 102 can also include a communication module 204. The communication module 204 can be configured to transmit data between modules, engines, databases, memories, and other components of the processing server 102 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the processing server 102 and external components of the processing server 102, such as externally connected databases, display devices, input devices, etc. The processing server 102 can also include a processing device. The processing device can be configured to perform the functions of the processing server 102 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, training module 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The processing server 102 can also include source data 206. Source data 206 can include labeled data and a plurality of associated features that can be used in domain adaptation using the methods discussed herein. In an exemplary embodiment, source data 206 can include data for a plurality of electronic payment transactions that are classified as either fraudulent or genuine. The processing server 102 can also include target data 208. Target data 208 can include unlabeled data and a plurality of associated features that can be used in domain adaptation using the methods discussed herein. In an exemplary embodiment, target data 208 can include data for a plurality of blockchain transactions that is unclassified. In some cases, target data 208 can include a mixture of labeled and unlabeled blockchain transaction data.

The processing server 102 can also include a memory 214. The memory 214 can be configured to store data for use by the processing server 102 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the processing server 102 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, cryptographic keys, cryptographic key pairs, cryptographic algorithms, encryption algorithms, deep neural network data, autoencoder data, domain adaptation algorithms, weights, loss values, etc.

The processing server 102 can include a querying module 216. The querying module 216 can be configured to execute queries on databases to identify information. The querying module 216 can receive one or more data values or query strings and can execute a query string based thereon on an indicated database, such as the memory 214 of the processing server 102 to identify information stored therein. The querying module 216 can then output the identified information to an appropriate engine or module of the processing server 102 as necessary. The querying module 216 can, for example, execute a query to identify labeled electronic payment transactions and associated features from the source data 206 for use in training a deep neural network.

The processing server 102 can also include a generation module 218. The generation module 218 can be configured to generate data for use by the processing server 102 in performing the functions discussed herein. The generation module 218 can receive instructions as input, can generate data based on the instructions, and can output the generated data to one or more modules of the processing server 102. For example, the generation module 218 can be configured to generate data messages, notification messages, data entries, etc. In some cases, the generation module 218 can be used to apply unlabeled blockchain transaction data to a finished feature set to identify likely fraudulent blockchain transactions.

The processing server 102 can also include a training module 220. The training module 220 can be configured to train neural networks using data and one or more algorithms. The training module 220 can receive an instruction for the training of a neural network, which can include the neural network, data for use in training, and/or one or more algorithms for use in the training, or where such data can be identified by the training module 220 after receiving the instruction. The training module 220 can then train a neural network as instructed, and then output the trained neural network or a notification regarding the training thereof to another module or engine of the processing server 102.

The processing server 102 can also include a transmitting device 222. The transmitting device 222 can be configured to transmit data over one or more networks via one or more network protocols. In some instances, the transmitting device 222 can be configured to transmit data to blockchain nodes 106, source data providers 108, payment networks 110, target data providers 112, and other entities via one or more communication methods, local area networks, wireless area networks, cellular communication, Bluetooth, radio frequency, the Internet, etc. In some embodiments, the transmitting device 222 can be comprised of multiple devices, such as different transmitting devices for transmitting data over different networks, such as a first transmitting device for transmitting data over a local area network and a second transmitting device for transmitting data via the Internet. The transmitting device 222 can electronically transmit data signals that have data superimposed that can be parsed by a receiving computing device. In some instances, the transmitting device 222 can include one or more modules for superimposing, encoding, or otherwise formatting data into data signals suitable for transmission.

The transmitting device 222 can be configured to electronically transmit data signals to blockchain nodes 106 and/or target data providers 112 that are superimposed or otherwise encoded with requests for target data and associated target features. The transmitting device 222 can also be configured to electronically transmit data signals to source data providers 108 and/or payment networks 110, which can be superimposed or otherwise encoded with requests for source data and associated source features. In some cases, the transmitting device 222 can also be configured to electronically transmit data signals to other systems that can be superimposed or otherwise encoded with requests for domain adaptation algorithms, weight values, loss values, etc.

Process for Identification of Fraudulent Transactions Via Domain Adaptation

Figure 3:
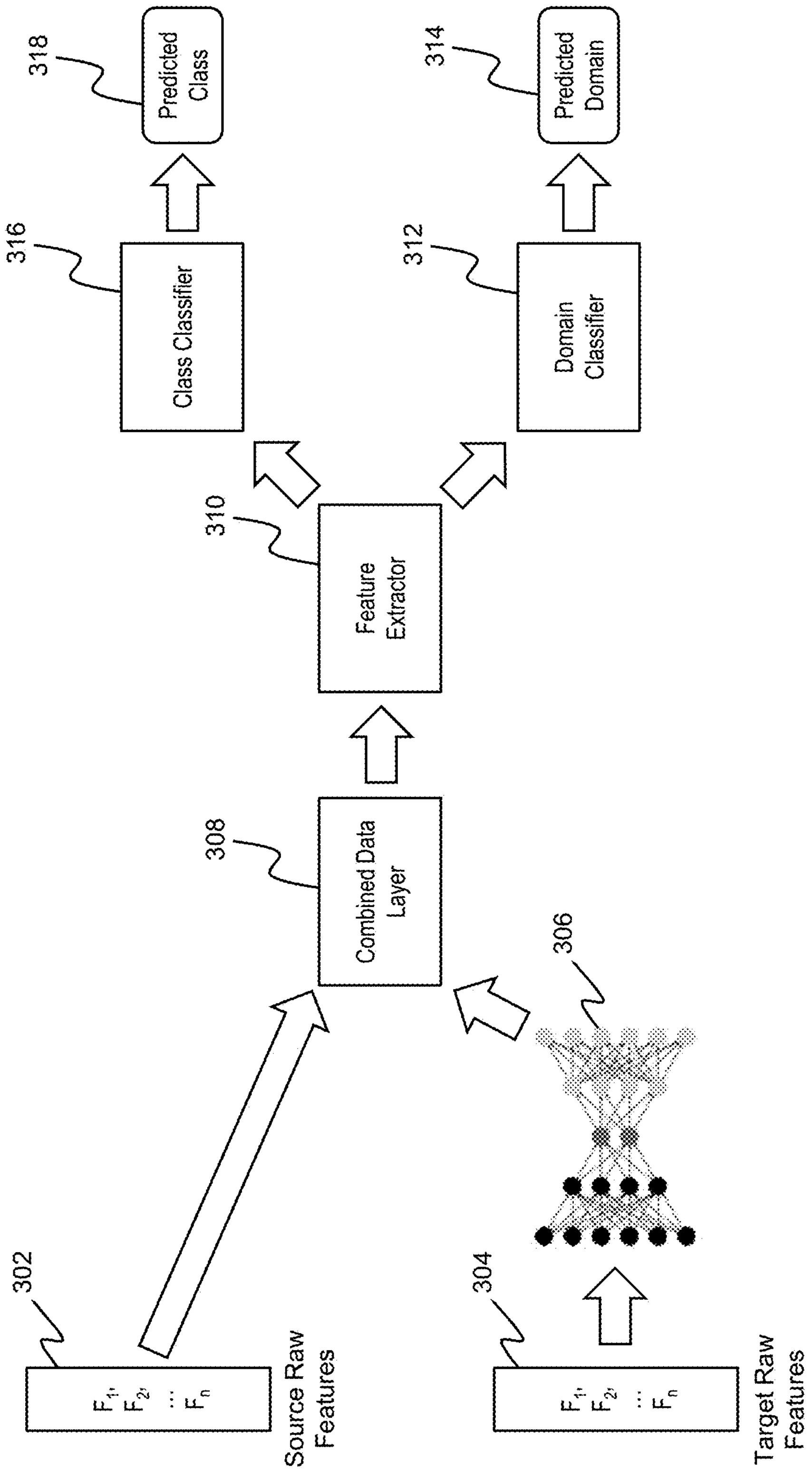
FIG. 3 is a flow diagram illustrating a process for identifying fraudulent cryptographic currency transactions in the system of FIG. 1 in accordance with exemplary embodiments.

FIG. 3 illustrates a process 300 executed by the processing server 102 in the system 100 of FIG. 1 to identify fraudulent blockchain transactions through the use of domain adaptation with labeled data of a source domain and unlabeled data of a target domain.

At 302, a plurality of source raw features can be received by the processing server 102 from one or more source data providers 108 along with labeled source data. The source raw features can be associated with the source data, and the source data can be labeled with an associated class of a plurality of classes. At 304, the processing server 102 can receive a plurality of target raw features from one or more target providers 112 along with unlabeled target data. The target raw features can be associated with the target data, which can be unlabeled with respect to associated classes. At 306, the training module 220 of the processing server 102 can train an autoencoder to, using the target raw features, identify a subset of target features.

At 308, the generation module 218 of the processing server can generate a combined data layer. The combined data layer can include a combined feature set of the source raw features and the subset of target features, and can also include the labeled source data and unlabeled target data. The training module 220 of the processing server can then train a deep neural network using Deep CORAL and the combined data layer. At 310, the deep neural network can utilize a feature extractor that can extract features from the features in the combined data layer. At 312, the deep neural network can use a domain classifier with the extracted features to identify a predicted domain 314 (e.g., electronic payment transaction or blockchain transaction) for data in the combined data layer. At 316, the deep neural network can use a class classifier with the extracted features to identify a predicted class 318 (e.g., fraudulent or genuine) for the data in the combined data layer.

The deep neural network can identify a classification loss as a result of the predicted classes 318 for the data when compared to the known classes in the labeled source data. The deep neural network can also identify a domain loss as a result of the predicted domains 314 for the data when compared to the source and target data in the combined data layer. The losses can be used with backpropagation in the further training of the deep neural network until a suitable loss value is identified. A suitable loss value can be a classification loss and/or domain loss that is within a predetermined value. In cases where Deep CORAL is used, a CORAL loss can be identified directly from the combined data layer as part of the domain adaptation from the source data to the target data. In such cases, the deep neural network can continue through training iterations until the CORAL loss is within a predetermined value. In some instances, the predetermined value for the CORAL loss can be a threshold value for a difference between the CORAL loss and classification loss. Once the training is sufficient (e.g., the loss value(s) are at suitable values and/or ranges), the extracted features can be used as a final feature set for identifying fraudulent transactions including identifying fraudulent blockchain transactions using unlabeled blockchain transaction data.

Process for Generation of Adapted Fraud Model

Figure 4:
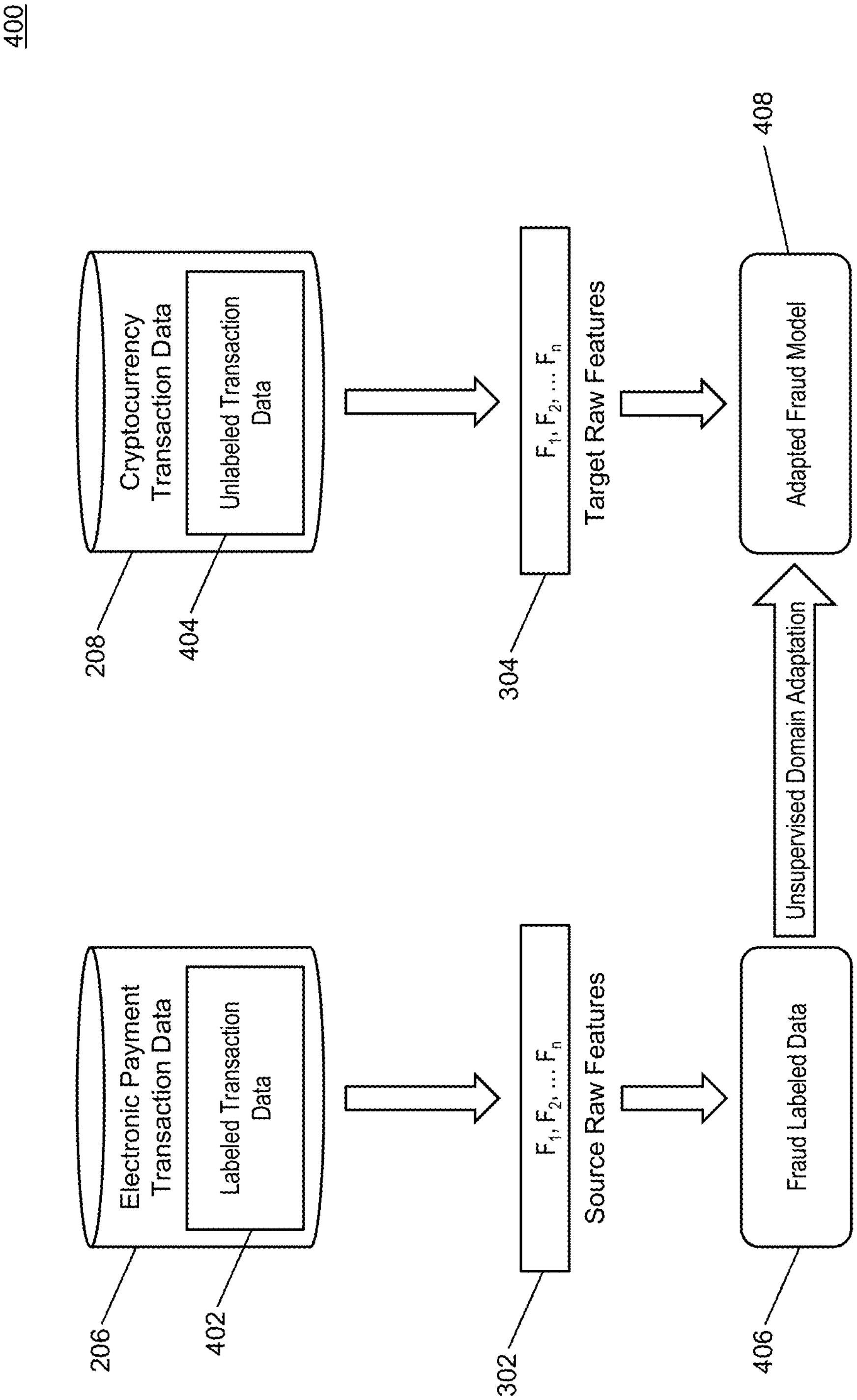
FIG. 4 is a flow diagram illustrating a process for generating an adapted model for identifying fraudulent cryptographic currency transactions in the system of FIG. 1 in accordance with exemplary embodiments.

FIG. 4 illustrates a process 400 for the generation of an adapted model for identifying fraudulent cryptographic currency transactions in the system 100 of FIG. 1 using domain adaptation.

The process 400 can utilize electronic payment transaction data 206 as source data. As discussed above, the electronic payment transaction data 206 can include labeled transaction data 402. The labeled transaction data 402 can include a plurality of data values for a plurality of electronic payment transactions that include at least one label, such as a label indicating if the corresponding transaction was determined to be fraudulent or genuine. A plurality of source raw features 302 can be identified by the processing server 102 from the source data, specifically the labeled transaction data 402.

The process 400 can also utilize cryptocurrency transaction data 208 as target data. As discussed above, the cryptocurrency transaction data 208 can include unlabeled transaction data 404. The unlabeled transaction data can include a plurality of data values for a plurality of cryptographic currency transactions that are not labeled with a class with respect to fraud. A plurality of target raw features 304 can be identified by the processing server 102 from the target data, specifically the unlabeled transaction data 404.

The processing server 102 can use the source raw features 302 as well as the labeled transaction data 402 to identify a set of fraud labeled data 406. The fraud labeled data 406 can include payment transactions in the electronic payment transaction data 206 that are classified as fraudulent and where data is available with respect to the various source raw features 302. The processing server 102 can use the fraud labeled data 406 and perform unsupervised domain adaptation, as discussed above, to generate an adapted fraud model 408. The adapted fraud model 408 can be configured to utilize the target raw features 304 of the cryptocurrency transaction data 208 to be able to determine if a cryptographic currency transaction is fraudulent or genuine.

The adapted fraud model 408 can be configured such that the model can be applied to unlabeled transaction data 404 that has data corresponding to the target raw features 304. Application of the model can utilize the data for the features and, based thereon utilizing the data learned from the labeled transaction data 402, source raw features 302, and unsupervised domain adaptation, determine if the applied cryptographic currency transaction is fraudulent or genuine. The adapted fraud model 408 can be applied to the existing unlabeled transaction data 402, and can also be applied to new transactions. For example, a blockchain node 106 can electronically transmit transaction data for a proposed new cryptographic currency transaction to the processing server 102. The processing server 102 can apply the adapted fraud model 408 to the proposed transaction and return a result, if the transaction is determined to be genuine or fraudulent, to the blockchain node 106. The blockchain node 106 can then approve and attempt to the confirm the transaction, or decline the transaction, accordingly. In some cases, the process 400 can be regularly repeated in order to updated and further train the adapted fraud model 408. In such cases, as new transaction data is obtained (e.g., labeled source data and labeled and unlabeled target data), the adapted fraud model 408 can be further improved for even greater accuracy. The result is an effective adapted fraud model 408 for identifying fraudulent cryptographic currency transactions without the need for labeled target data through unsupervised domain adaptation.

Exemplary Method for Identifying Fraudulent Cryptocurrency Transactions

FIG. 5 illustrates a method 500 for the identification of fraudulent cryptographic currency transactions via the use of a deep neural network and domain adaptation.

In step 502, a source dataset can be received by a receiver (e.g., receiving device 202) of a processing server (e.g., processing server 102), the source dataset including labeled source data associated with a plurality of source features and being associated with a source domain (e.g., payment network 110). In step 504, a target dataset can be received by the receiver of the processing server, the target dataset including unlabeled target data associated with a plurality of target features and being associated with a target domain (e.g., blockchain network 104).

In step 506, at least a subset of the plurality of source features and at least a subset of the plurality of target features can be combined by a processor (e.g., generation module 218) of the processing server into a combined data layer. In step 508, a deep neural network can be trained by the processor (e.g., training module 220) of the processing server using a domain adaptation algorithm and the combined data layer to identify a set of final features.

In one embodiment, the method 500 can further include training, by the processor (e.g., training module 220) of the processing server, a first autoencoder on the plurality of target features to identify the subset of the plurality of target features. In some embodiments, the method 500 can also include training, by the processor (e.g., training module 220) of the processing server, a second autoencoder on the plurality of source features to identify the subset of the plurality of source features. In one embodiment, the domain adaptation algorithm can be Deep CORAL, and the deep neural network can be trained until a difference between a CORAL loss and a classification loss is within a predetermined value. In some embodiments, the method 500 can further include transmitting, by a transmitter (e.g., transmitting device 222) of the processing server, the identified set of final features for application to data associated with the target domain.

In one embodiment, the source domain can be electronic payment transactions; and the target domain can be cryptographic currency transactions. In a further embodiment, the method 500 can also include applying, by the processor (e.g., generation module 218) of the processing server, the identified set of final features to the target dataset to identify one or more fraudulent cryptographic currency transactions. In another further embodiment, the method 500 can further include: receiving, by the receiver of the processing server, a new dataset associated with the target domain; and applying, by the processor (e.g., generation module 218) of the processing server, the identified set of final features to the new dataset to identify one or more fraudulent cryptographic currency transactions.

Computer System Architecture

Figure 6:
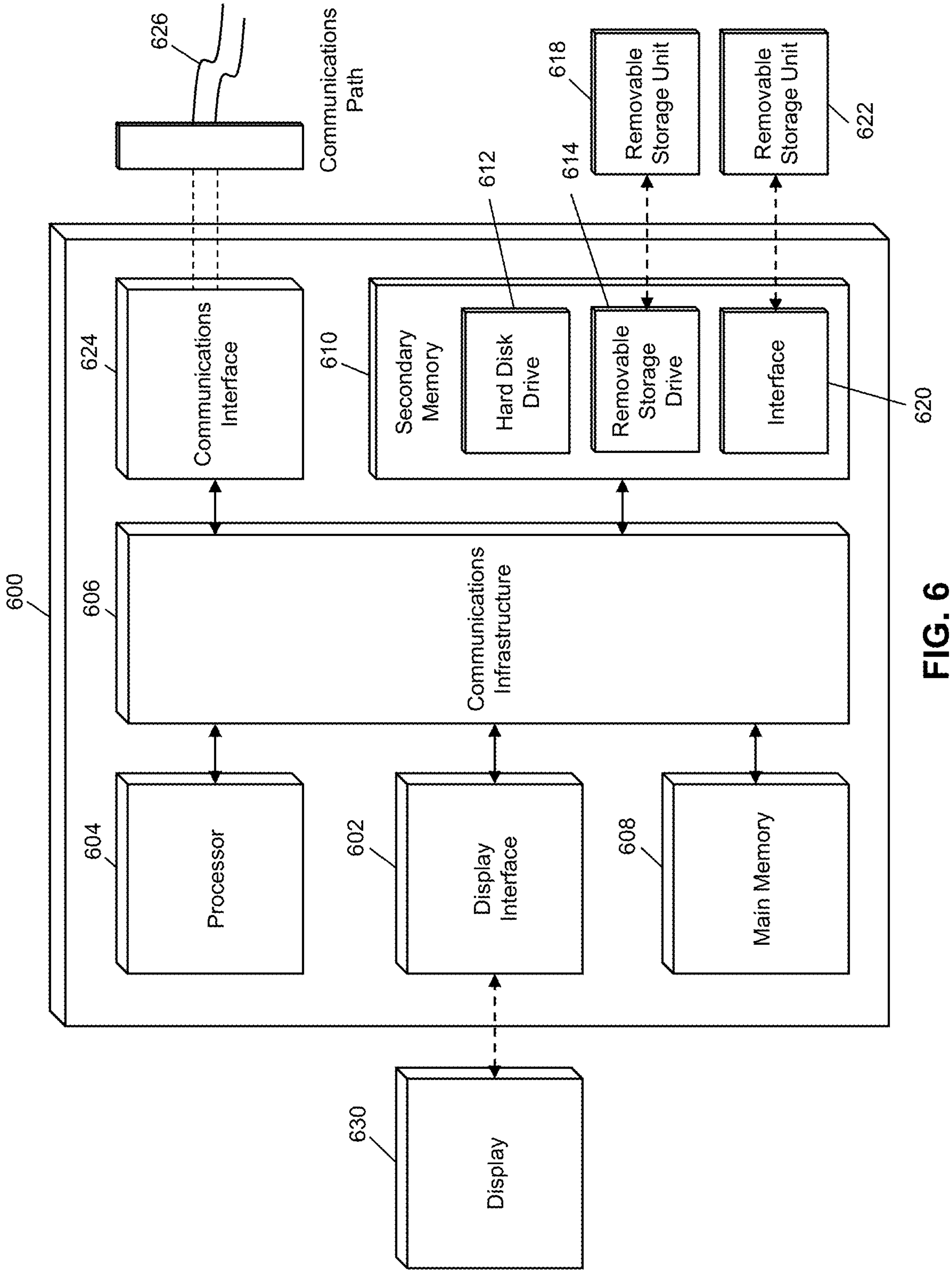
FIG. 6 is a block diagram illustrating a computer system architecture in accordance with exemplary embodiments.

FIG. 6 illustrates a computer system 600 in which embodiments of the present disclosure, or portions thereof, can be implemented as computer-readable code. For example, the processing server 102, blockchain nodes 106, source data provider 108, payment network 110, and target data provider 112 can be implemented in the computer system 600 using hardware, non-transitory computer readable media having instructions stored thereon, or a combination thereof and can be implemented in one or more computer systems or other processing systems. Hardware can embody modules and components used to implement the methods of FIGS. 3-5.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 604 can be a special purpose or a general purpose processor device specifically configured to perform the functions discussed herein. The processor device 604 can be connected to a communications infrastructure 606, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 can also include a main memory 608 (e.g., random access memory, read-only memory, etc.), and can also include a secondary memory 610. The secondary memory 610 can include the hard disk drive 612 and a removable storage drive 614, such as a floppy disk drive, a magnetic tape drive, an optical disk drive, a flash memory, etc.

The removable storage drive 614 can read from and/or write to the removable storage unit 618 in a well-known manner. The removable storage unit 618 can include a removable storage media that can be read by and written to by the removable storage drive 614. For example, if the removable storage drive 614 is a floppy disk drive or universal serial bus port, the removable storage unit 618 can be a floppy disk or portable flash drive, respectively. In one embodiment, the removable storage unit 618 can be non-transitory computer readable recording media.

In some embodiments, the secondary memory 610 can include alternative means for allowing computer programs or other instructions to be loaded into the computer system 600, for example, the removable storage unit 622 and an interface 620. Examples of such means can include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 600 can also include a communications interface 624. The communications interface 624 can be configured to allow software and data to be transferred between the computer system 600 and external devices. Exemplary communications interfaces 624 can include a modem, a network interface (e.g., an Ethernet card), a communications port, a PCMCIA slot and card, etc. Software and data transferred via the communications interface 624 can be in the form of signals, which can be electronic, electromagnetic, optical, or other signals as will be apparent to persons having skill in the relevant art. The signals can travel via a communications path 626, which can be configured to carry the signals and can be implemented using wire, cable, fiber optics, a phone line, a cellular phone link, a radio frequency link, etc.

The computer system 600 can further include a display interface 602. The display interface 602 can be configured to allow data to be transferred between the computer system 600 and external display 630. Exemplary display interfaces 602 can include high-definition multimedia interface (HDMI), digital visual interface (DVI), video graphics array (VGA), etc. The display 630 can be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 608 and secondary memory 610, which can be memory semiconductors (e.g., DRAMs, etc.). These computer program products can be means for providing software to the computer system 600. Computer programs (e.g., computer control logic) can be stored in the main memory 608 and/or the secondary memory 610. Computer programs can also be received via the communications interface 624. Such computer programs, when executed, can enable computer system 600 to implement the present methods as discussed herein. In particular, the computer programs, when executed, can enable processor device 604 to implement the methods illustrated by FIGS. 3-5, as discussed herein. Accordingly, such computer programs can represent controllers of the computer system 600. Where the present disclosure is implemented using software, the software can be stored in a computer program product and loaded into the computer system 600 using the removable storage drive 614, interface 620, and hard disk drive 612, or communications interface 624.

The processor device 604 can comprise one or more modules or engines configured to perform the functions of the computer system 600. Each of the modules or engines can be implemented using hardware and, in some instances, can also utilize software, such as corresponding to program code and/or programs stored in the main memory 608 or secondary memory 610. In such instances, program code can be compiled by the processor device 604 (e.g., by a compiling module or engine) prior to execution by the hardware of the computer system 600. For example, the program code can be source code written in a programming language that is translated into a lower level language, such as assembly language or machine code, for execution by the processor device 604 and/or any additional hardware components of the computer system 600. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

The use of unsupervised domain adaptation for detecting crypto fraud, and more specifically the use of unsupervised domain adaptation to utilize labeled data for other types of transactions to identify useful feature sets for identifying fraudulent transactions from unlabeled crypto data, provides multiple technological advantages over current ways of detecting fraudulent cryptocurrency transactions. For instance, the technology disclosed herein provides for greater accuracy in detecting fraud and therefore increasing security of blockchain-based transactions and more generally cryptocurrency transactions. These advantages further include utilizing a wealth of historical data that includes known fraudulent transactions and known genuine transactions involving traditional payment transactions to identify the useful feature sets for identifying fraudulent transactions from unlabeled crypto data via use of unsupervised domain adaptation. Without this new technology, fraud could continue to be the significant problem that has been plaguing cryptocurrency transactions for years, and can be quickly adopted because this technological improvement utilizes labeled data for electronic payment transactions to detect fraud for unlabeled blockchain transactions in a new and non-obvious way.

Techniques consistent with the present disclosure provide, among other features, systems and methods for identifying fraudulent cryptographic currency transactions using a deep neural network. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for identifying fraudulent cryptographic currency transactions using a deep neural network, comprising:

receiving, by a receiver of a processing server, from a source data provider, a source dataset including labeled source data for electronic payment transactions processed by payment rail, said labeled source data being associated with a plurality of source features and with a source domain, wherein the source domain is a traditional payment service provider domain and the labeled source data includes financial data processed by the payment rails;

receiving, by the receiver of the processing server, from a blockchain node of a blockchain network, a target dataset including unlabeled blockchain transaction data associated with a plurality of target features and corresponding to a target domain, wherein the target domain is a blockchain domain, and wherein the processing server communicates between the source data provider, the blockchain network and a payment network and wherein the blockchain transaction data includes cryptographic transaction elements;

combining, by a processor of the processing server, at least a subset of the plurality of source features and at least a subset of the plurality of target features into a combined data layer;

training, by the processor of the processing server, a deep neural network using a domain adaptation algorithm and the combined data layer until a difference between a CORAL loss and a classification loss is within a predetermined value, wherein the domain adaptation algorithm aligns labeled source features associated with the labeled source data from the traditional payment service provider domain with unlabeled target features associated with the unlabeled blockchain transaction data from the blockchain domain to identify a set of final features; and identifying one or more fraudulent cryptographic currency blockchain transactions by applying, by the processor of the processing server, the identified set of final features to the target dataset.

2. The method of claim 1, further comprising:

training, by the processor of the processing server, a first autoencoder on the plurality of target features to identify the subset of the plurality of target features.

3. The method of claim 2, further comprising:

training, by the processor of the processing server, a second autoencoder on the plurality of source features to identify the subset of the plurality of source features.

4. The method of claim 1, wherein the domain adaptation algorithm is Deep CORAL.

5. The method of claim 1, further comprising:

transmitting, by a transmitter of the processing server, the identified set of final features for application to data associated with the target domain.

6. The method of claim 1, further comprising:

receiving, by the receiver of the processing server, a new dataset associated with the target domain; and applying, by the processor of the processing server, the identified set of final features to the new dataset to identify additional one or more fraudulent cryptographic currency blockchain transactions.

7. A system for identifying fraudulent cryptographic currency transactions using a deep neural network, comprising:

a source data provider;

a blockchain network;

a payment network; and a processing server that communicates between the source data provider, the blockchain network and the payment network and includes a processor and a memory, the memory having instructions stored thereon that when executed, cause the processor to receive, from the source data provider, a source dataset including labeled source data for electronic payment transactions processed by payment rails, said labeled source data being associated with a plurality of source features and with a source domain, wherein the source domain is a traditional payment service provider domain and the labeled source data includes financial data processed by the payment rails, receive, from a blockchain node of the blockchain network, a target dataset including unlabeled blockchain transaction data associated with a plurality of target features and corresponding to a target domain, wherein the target domain is a blockchain domain, and wherein the blockchain transaction data includes cryptographic transaction elements, combine at least a subset of the plurality of source features and at least a subset of the plurality of target features into a combined data layer, train a deep neural network using a domain adaptation algorithm and the combined data layer until a difference between a CORAL loss and a classification loss is within a predetermined value, the domain adaptation algorithm aligns labeled source features associated with the labeled source data from the traditional payment service provider domain with unlabeled target features associated with the unlabeled blockchain transaction data from the blockchain domain to identify a set of final features, and identify one or more fraudulent cryptographic currency blockchain transactions by applying, by the processing server, the identified set of final features to the target dataset.

8. The system of claim 7, wherein the processor of the processing server trains a first autoencoder on the plurality of target features to identify the subset of the plurality of target features.

9. The system of claim 8, wherein the processor of the processing server, trains a second autoencoder on the plurality of source features to identify the subset of the plurality of source features.

10. The system of claim 7, wherein the domain adaptation algorithm is Deep CORAL.

11. The system of claim 7, wherein the processing server further includes a transmitter transmitting the identified set of final features for application to data associated with the target domain.

12. The system of claim 7, wherein the receiver of the processing server receives a new dataset associated with the target domain, and the processor of the processing server applies the identified set of final features to the new dataset to identify additional one or more fraudulent cryptographic currency blockchain transactions.

* * * * *